United States Patent [19]
Adell

[11] Patent Number: 5,119,067
[45] Date of Patent: Jun. 2, 1992

[54] REAR VEHICLE COURTESY BRIGHT LIGHT DIMMING SIGNAL SYSTEM

[76] Inventor: Robert Adell, 27550 W. 14 Mile Rd., Franklin, Mich. 48025

[21] Appl. No.: 534,551
[22] Filed: Jun. 6, 1990
[51] Int. Cl.$^5$ .............................................. B60Q 1/26
[52] U.S. Cl. .................................. 340/468; 340/469; 340/470; 340/471; 340/472
[58] Field of Search ............... 340/468, 469, 470, 471, 340/472, 457.2, 482

[56] References Cited

U.S. PATENT DOCUMENTS

| | | | |
|---|---|---|---|
| 2,400,655 | 5/1946 | Saia | 340/470 |
| 2,878,462 | 2/1959 | Tralli | 340/468 |
| 3,192,437 | 6/1965 | Meyer | 340/471 |
| 3,517,384 | 6/1970 | Jablonksi | 340/468 |
| 3,678,457 | 7/1972 | Lev | 340/468 |
| 4,037,197 | 7/1977 | Courty | 340/468 |
| 4,859,988 | 8/1989 | Holtvluwer | 340/471 |
| 4,989,121 | 1/1991 | Hall | 340/468 |

*Primary Examiner*—Donnie L. Crosland
*Attorney, Agent, or Firm*—Alex Rhodes

[57] ABSTRACT

A motor vehicle signalling system for requesting a driver of a vehicle behind another vehicle to dim his bright lights. The signalling system is low in cost, improves vehicle safety, promotes driver courtesy and is adaptable to all motor vehicle styles and models. The signalling system includes a flashing colored light mounted on the rear of the signalling vehicle and a control circuit for operating the flashing light. The signalling light is mounted in a common housing with an "eye level" stop light on a rear package tray and when operated produces a high intensity flashing beam of colored light to attract the attention of the driver of the rear vehicle. The control system has three states, a normally off state, an operating state wherein the signal light flashes for a predetermined time, and an operating state wherein the signal light flashes continuously. Alternate embodiments are disclosed wherein the signal light is automatically controlled and/or is located in a common housing with the vehicle's other lights.

24 Claims, 6 Drawing Sheets

REAR VEHICLE COURTESY BRIGHT LIGHT DIMMING SIGNAL SYSTEM

BACKGROUND OF THE INVENTION

This invention relates to a vehicle signalling system and more particularly to a signalling system for requesting drivers who are operating a vehicle behind another vehicle to dim or turn on their headlights.

It is not uncommon, on highways and in city traffic, for drivers to neglect to dim or turn on their headlights. Light from headlight high beams reflect off side view and rear view mirrors into drivers' eyes. The reflected light is a source of tremendous annoyance and distraction and impairs the ability of drivers to observe the road and control their vehicles.

Vehicle manufacturers have responded to this problem by equipping some vehicles with "day and night" rear view mirrors. The mirrors help to reduce glare but cause another problem because they substantially reduce night vision. Any reduction of vision at night is undesirable and can cause serious accidents, especially when vehicles are travelling at high speeds and changing lanes. Furthermore, the "day and night" mirror is not applicable to the side view mirrors of trucks which cannot be adjusted during driving and require wrenches for angular adjustments.

The failure to turn on headlights also affects vehicle safety. This usually occurs at sundown when some sunlight is still available to prevent a driver from becoming aware that his headlights are not turned on. The failure to turn on headlights can also cause serious accidents, by way of example, "head on" collisions between vehicles changing lanes.

Because of fierce competition for buyers, controlling costs is of major concern to vehicle manufacturers and they are reluctant to make changes which add cost to their products. Manufacturers are also reluctant to make changes which increase their warranty costs and restrict the freedom of their designers to create original and competitive styles which satisfy the tastes of the public. It is noteworthy that in an industry which is as competitive as the automotive industry, it is extremely rare to add new features at very, very low investment and manufacturing costs.

From the foregoing, it is apparent that a successful solution to the foregoing problem will have to be low in cost, reliable and have little, if any, effect on vehicle styling.

SUMMARY OF THE INVENTION

The present invention overcomes the foregoing problem by providing a visual signalling system which is very, very low in cost, reliable and independent of vehicle styling. The invention resides in a novel signalling system which to a high degree utilizes existing vehicle components. As will be seen, the invention is adaptable to all vehicle types and styles, including, but not limited to standard passenger sedans, convertibles, recreational vehicles, trailers, vans and trucks.

One benefit of my invention is that it improves vehicle safety.

Another benefit is that it can be immediately incorporated by manufacturers into new vehicle programs as original equipment.

Another important benefit is that the investment and manufacturing costs are very, very low.

Another benefit is that it can be marketed as an after market accessory to retrofit existing vehicles.

My signalling system comprises flashing lights mounted in an existing high mounted stop light with associated wiring and controls. The lights are preferably high intensity and color coded, by way of example green or blue, and are provided with either a manual driver operated control or an automatic control which responds to bright headlight beams from rear vehicles.

Combining the signalling light with an existing light offers a rare opportunity to provide a badly needed feature which serves safety, convenience and last but not least driver courtesy, at very, very low investment and manufacturing costs. While an inventor cannot dictate to a vehicle manufacturer where to position the signalling lights, it is suggested that they be mounted at the eye level of a driver in a rear vehicle or as close to eye level as possible.

The foregoing features, benefits and advantages, together with additional features, benefits and advantages, will become apparent from the ensuing detailed description of a preferred embodiment and the accompanying drawings. The best mode contemplated in practicing the invention is disclosed and the subject matter in which exclusive property rights are claimed is set forth in each of the numbered claims at the conclusion of the detailed description.

DETAILED DESCRIPTION OF THE PREFERRED EMBODIMENT

Figure 1:
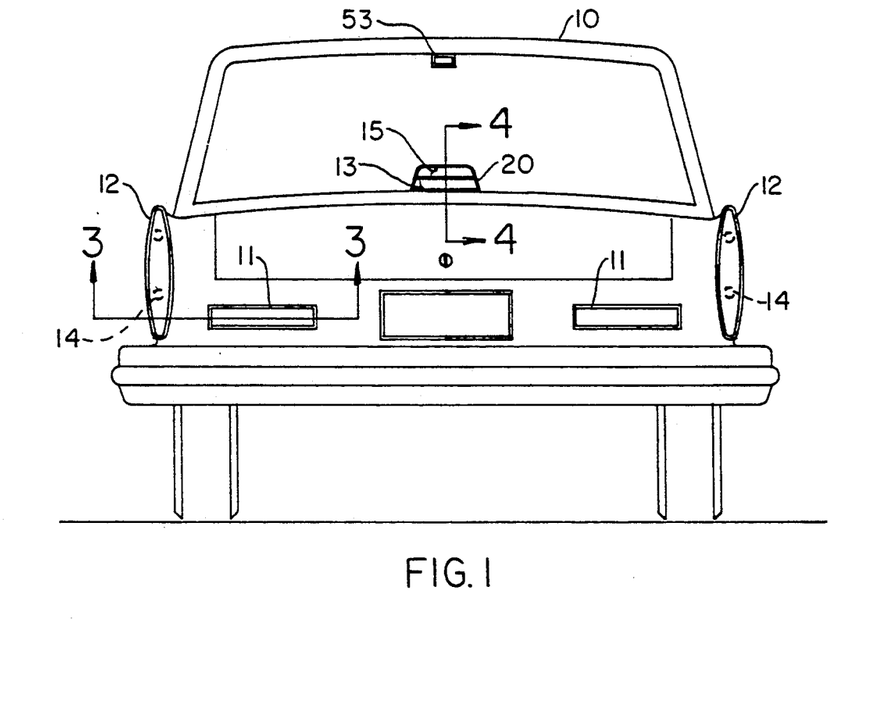
FIG. 1 is a rear view of a passenger vehicle which embodies my invention.
Figure 2:
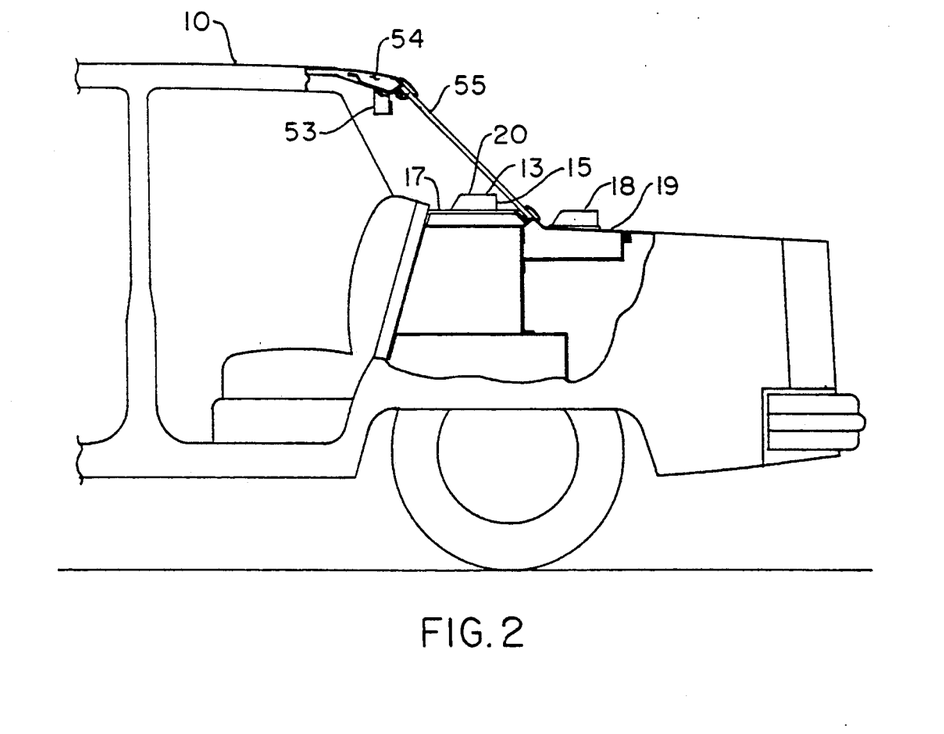
FIG. 2 is a partial left side view of the passenger vehicle of FIG. 1.

Referring now to the drawings wherein like numerals designate like and corresponding parts throughout the several views, in FIGS. 1 and 2, is shown for purposes of illustrating my invention a typical passenger sedan 10 which embodies my invention. It is to be understood that my invention is not limited to sedans and applies to all types and styles of motor vehicles, by way of example, sedans, convertibles, motor homes, recreational vehicles, trailers, vans, trucks, motorcycles and the like.

The sedan 10 has a pair of front mounted headlights (not shown), an interior headlight switch (not shown), a pair of rear mounted back-up lights 11, a pair of rear mounted tail/stop lights 12, and a rear mounted "eye level" stop light 13. The stop lights 14 of the tail/stop lights 12 also serve as rear turn signal lights and emergency signal lights and flash "on and off" when driver controls (not shown) are operated.

With reference to FIGS. 2, a signalling light 15 is combined with the "eye level" stop light 13. The "eye level" stop light 13 is centrally mounted in the interior of the vehicle on a package tray 17. Also shown in FIG. 2 is an "eye level" stop light 18 for a convertible which is mounted on an exterior body panel 19 because of the unavailability of a package tray.

The "eye level" stop light 13 is a most desirable location to gain the attention of a driver operating a motor vehicle behind another motor vehicle because the "eye level" stop light 13 is easily seen by the driver of the rear vehicle and is remote from the other lights of the vehicle. Furthermore, the likelihood of the stop light 13 obscuring the visibility of the signalling light 15 is low because the stop light 13 operates only when the vehicle's brakes are applied. Another benefit is that only a single signalling light 15 is needed.

Figure 4:
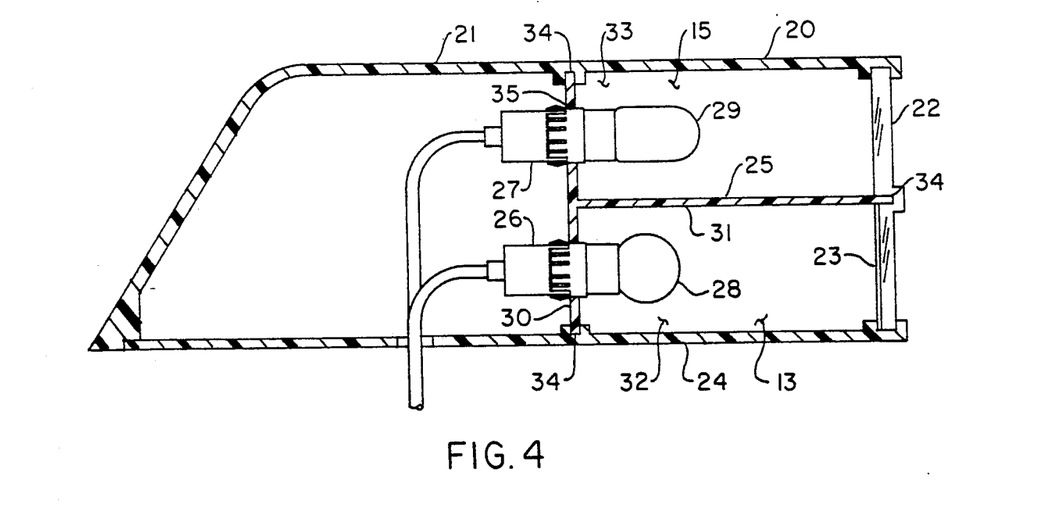
FIG. 4 is an enlarged cross-sectional view taken on the line 4—4 which "eye level" stop light and a signalling light mounted common housing.

The construction of the combined "eye level" stop/signalling light 20 is shown in FIG. 4. The stop/signalling light 20 has a generally rectangular housing 21 with open bottom and rear end portions. A clear lens 22 and red stop light lens 23 cove the open rear portion of the housing 21 and a base plate 24 covers the open bottom portion. The clear lens 22 and red stop light lens 23 have optics which are consistent with the standard design practices of the motor vehicle industry for exterior lighting.

Inside of the housing 21 there is a T-shaped member 25, a stop light socket 26, a signalling light socket 27, a clear stop light bulb 28, and a signalling light bulb 29. The signalling light bulb 29 is preferably green, blue or some other color which is readily distinguishable from the vehicle's red and amber colored lights. The signalling light bulb 29 is preferably a high intensity bulb and is preferably regulated by a control system, which will be later described, to flash at a higher rate than the vehicle's turn signals. The higher flashing rate is desirable t gain the attention of the driver of the rear vehicle and to further distinguish the signalling light 15 from the vehicle's other lights. A colored lens may be used with a clear bulb in place of the colored signalling light bulb 29.

The T-member 25 has a vertical wall 30 and an intersecting horizontal wall 31 which partition the interior of the housing 21 into two compartments, a lower compartment 32 for the stop light bulb 28 and an upper compartment 33 for the signalling light bulb 29. The T-member 25 is located and retained in grooves S4 of the housing 21, base plate 24 and lens 22. In the vertical wall 30 of the T-member 25 are apertures 35 which receive the stop light socket 26 and the signalling light socket 27. The stop light socket 26 and signalling light socket 27 are conventional and retain the stop light bulb 28 and signalling light bulb 29, respectively.

Figure 5:
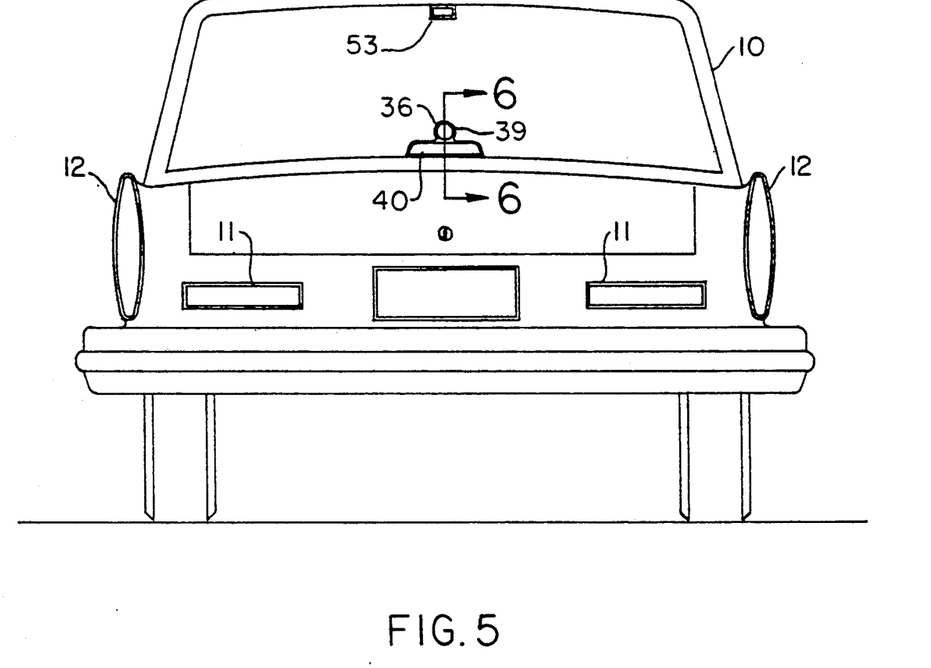
FIG. 5 is a rear view of a passenger vehicle which incorporates an embodiment of my invention.
Figure 6:
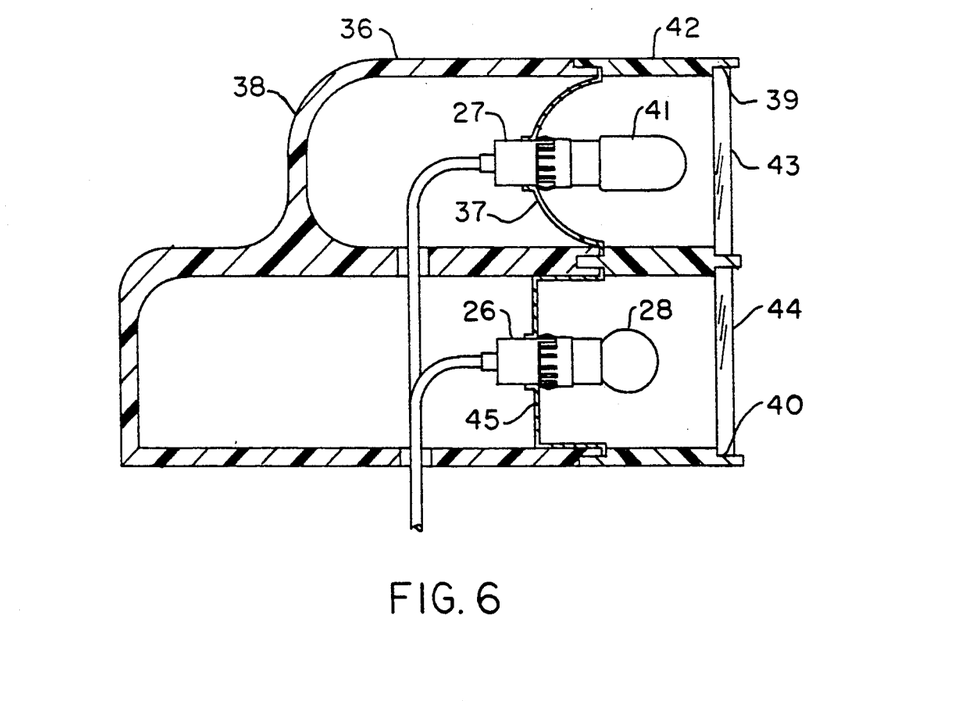
FIG. 6 is an enlarged cross-sectional view taken on the line 6—6 which shows an alternate embodiment of an "eye level" stop light and a signalling light mounted in a common housing.

With reference to FIGS. 5 and 6, an alternate embodiment 36 is shown having a parabolic reflector 37 which focuses the beam from the signalling light bulb 29 to produce a spot light effect. A housing 38 has a circular upper portion 39 for mounting a high intensity clear signalling light bulb 41 and an adjoining rectangular lower portion 40 for mounting a clear stop light bulb 28. The front portion of the housing 38 is open and is covered with a bezel 42 in which are mounted a green or blue circular signalling light lens 43 and a red rectangular stop light lens 44. In the interior of the housing 38 is a stop light reflector which carries the stop light socket 26 and the parabolic signalling light reflector 45 which carries the signalling light socket 27. The stop light reflector 45 and parabolic signalling light reflector 37 are retained by the bezel 42.

Although the "eye Level" stop light 13 is an desirable location for my headlight dimming signalling light. There are other locations which may not be as desirable but are nevertheless suitable. By way of example, in FIG. 3, I have shown the colored signalling lamp bulb 29 mounted in the same housing 46 with a back-up light bulb 47. The pair of back-up lights 11 are suitable for mounting signalling lamp bulbs 29 for the following reasons.

Figure 3:
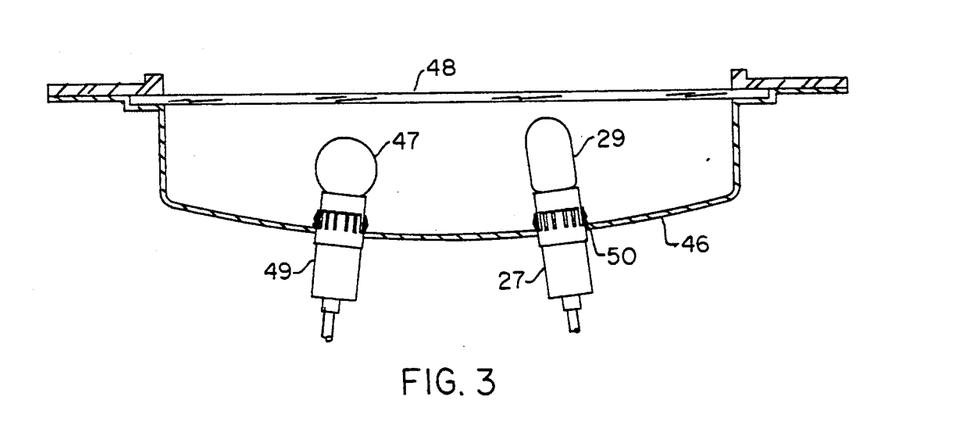
FIG. 3 is an enlarged cross-sectional view taken on the line 3—3 of FIG. 1 which shows a back-up light and a signalling light mounted in a common housing.

One reason is that the back-up lights 11 operate only when the vehicle's transmission is in reverse whereas the signalling lights 15 operate only when the transmission is in a forward gear and the vehicle is travelling in a forward direction. Another reason is that the back-up lamps 11 have clear or frosted lenses 48 which can be used for both the clear back-up light bulb 47 and the colored signalling light bulb 29. Still yet other reasons are that the signalling light bulbs 29 can be added to the back-up light housings 46 without vehicle modifications or affecting vehicle styling.

Referring again to FIG. 3, each of the combined back-up/signalling lights includes the housing 46, a back-up light socket 49, a signalling light socket 27, the clear back-up light bulb 47, the colored signalling bulb 29, and the clear or frosted lens 48. One advantage of this embodiment is that separate compartments are not required for the clear back-up light bulb 47 and the colored signalling light bulb 29 Another advantage is that the signalling light sockets 27 can be added to the back-up lights 11 by merely adding an aperture 50 in each of the housings 46. The disadvantages of this location over the "eye level" stop lamp 13 location is that it is less remote from the vehicle's other lights and is not as easily seen by the driver of the rear vehicle.

Figure 7:
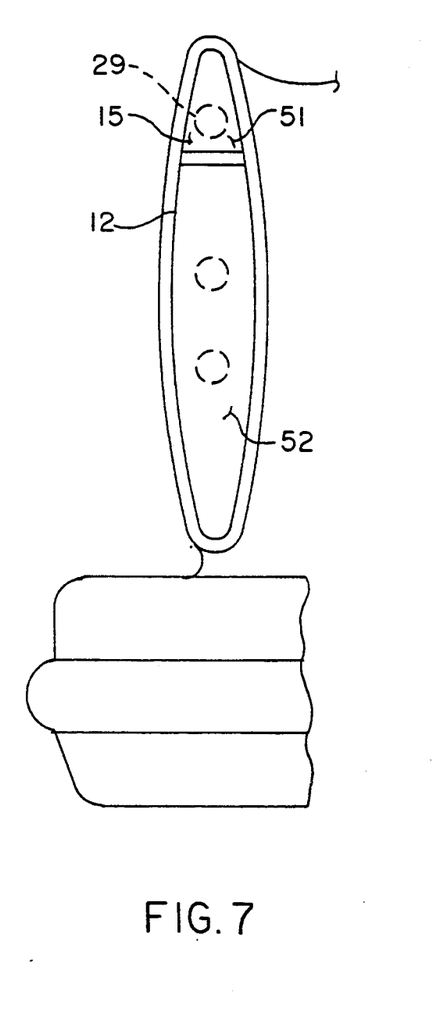
FIG. 7 is an partial view of the rear end of a passenger vehicle showing a tail/stop light and a signalling light mounted in a common housing.

In FIG. 7, I have illustrated still yet another location for the signalling lights 15, i.e., the stop/tail lights 12. A signalling light bulb 29 may be mounted in the stop/tail lights 14 by partitioning them into a separate upper 51 and lower 52 compartment and mounting a signalling lamp socket 27 and bulb 29 in the upper compartment. In certain models, such as trailers and trucks, it may be a desirable alternative.

Referring now to FIGS. 1 and 2, inside of the vehicle 10, a photo cell unit 53 is mounted on a lateral structural body member 54 and projects downwardly into the upper portion of the rear window opening 55. The photocell unit 53 is part of an automatic control circuit which will be later described.

Figure 8:
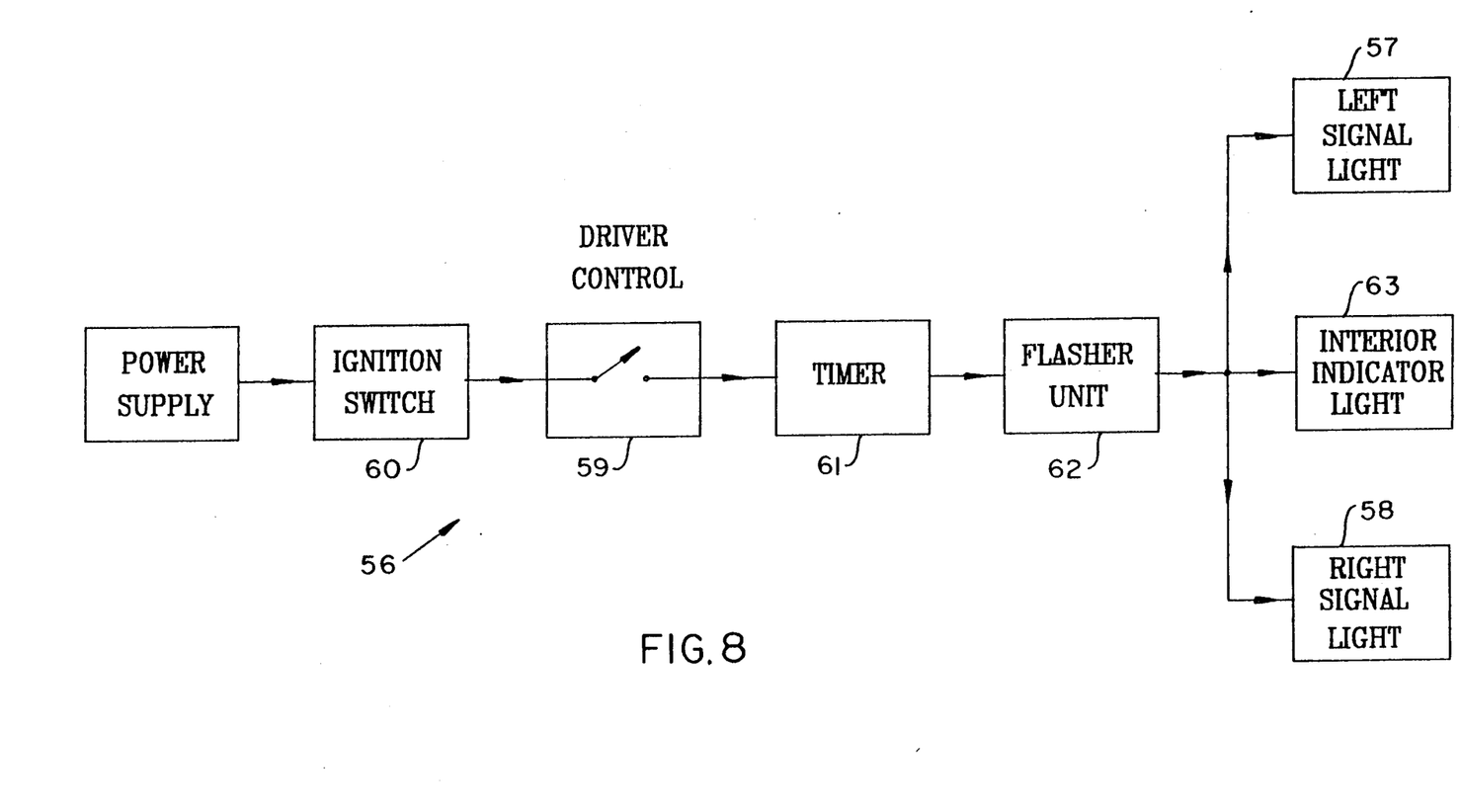
FIG. 8 is a schematic diagram of the circuit for manually controlling my headlight dimming signalling system.
Figure 9:
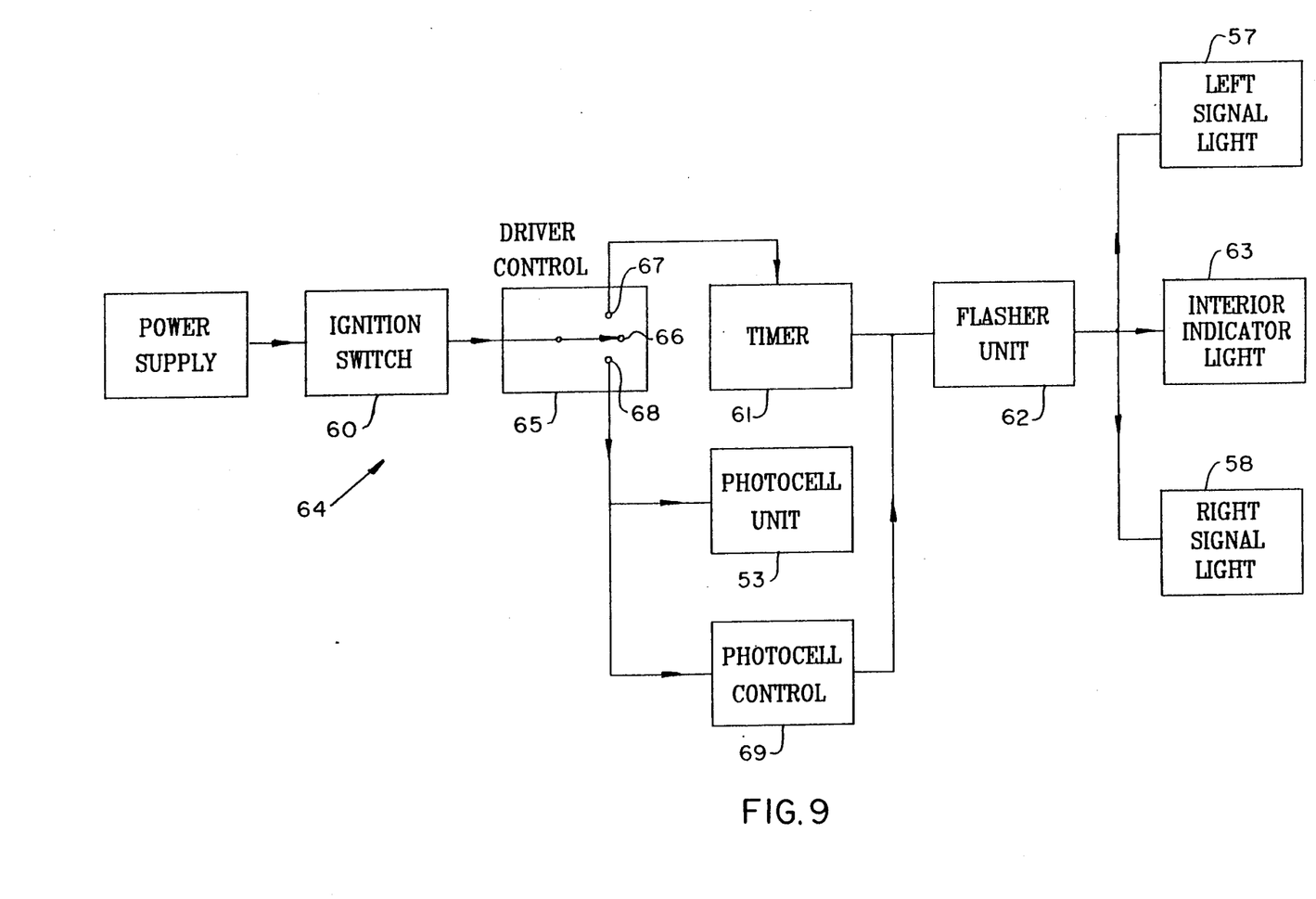
FIG. 9 is a schematic diagram of a circuit for automatically controlling my headlight dimming signalling system.

A manual control circuit 56 for operating a left 57 and a right 57 signalling bulb, mounted in the back-up light housings 46, is shown in schematic form in FIG. 8. A driver operated control 59, namely, a single pole-single throw switch (SPSF) 59 is connected in series with a vehicle's ignition switch 60. The driver control 59 is at a location which is readily accessible to a driver, by way of example, on an instrument panel, a door trim panel or steering column. The driver control 59 is spring biased to a normally open position such that the circuit is broken when the control 59 is released to insure that the signalling system 15 will not be inadvertently left in operation. The driver control 59 is connected in series with a time delay 61 which is in series with a flasher unit 62. The flasher unit 62 supplies current to the left 57 and right 58 signalling light bulbs. As an optional feature, an interior indicator light 63 is connected in parallel with the left 57 and right 58 signalling light bulbs to inform the driver that the signalling system is operating. Since the signalling system is operative only at night, the driver control 59 may be wired in series with the vehicle's light switch (not shown), instead of the ignition switch 60.

The manual control 56 is operated as follows. When the driver control 59 is momentarily closed and released by a driver, the timer 61 feeds current to the flasher unit 62 for a predetermined time and the left 57 and right 58 signalling bulbs flash for the predetermined time and then cease to operate. If the driver control 59 is held closed by the driver, the flasher continuously receives current from the timer 61 and the left 57 and right 58 lights flash until the control 59 is released.

The automatic control circuit 64 is shown schematically in FIG. 8. A driver control 65, namely, a double pole switch connected in series with the vehicle's ignition switch 60. The center position 66 of the control 65 switch is an "Off" position in which the system is inoperative. One end position 67 of the control switch is spring biased to return the control 65 to the center "Off" position 66 and is used for the manual operation of the system as previously described. The other position 68 is for automatic operation. The photocell unit 53 is connected to the automatic terminal 68 of the control 64. When a strong light beam impinges on the photocell 53, the photocell becomes conductive and feeds current to the flasher unit 62, causing the left 57 and right 58 signalling lights to flash. When the beam of light ceases to impinge on the flasher unit 62, the photocell stops conducting and the signalling lights 57, 58 cease to flash. A sensitivity control 69 is provided to adjust the level at which the photocell unit 2 will conduct. The manual operation of control is as previously described.

From the foregoing, it will be understood that my invention provides a low cost means of providing a badly needed safety feature in a motor vehicle. Moreover, this feature improves driver courtesy, can be immediately incorporated by motor vehicle manufacturers into new vehicles, and can be sold on the after market to retrofit existing vehicles.

Although but several embodiments of my invention have been illustrated and described, it is not my intent to limit my invention to these embodiments. It will be appreciated that after having the benefit of this disclosure, other embodiments can be developed by changes such as the substitution and re-arrangement of components without departing from the spirit thereof.

I claim:

1. In a motor vehicle of the type having a pair of headlights, a pair of combination stop and tail lights, an "eye level" stop light and a pair of back-up lights, a system for signalling a driver of a vehicle travelling behind another vehicle to dim his vehicles's bright headlights comprising: at least one dedicated signalling light mounted on the rear of a vehicle and enclosed in a common housing with another light of said signalling vehicle, said signalling light being adapted when operative to display a flashing signal for requesting a driver who is operating a vehicle behind the signalling vehicle to dim his vehicle's bright headlights; a power supply for supplying electrical power to said signalling light; and a control system for controlling the operation of said signalling light; said control system having a spring biased normally open driver operable switch for returning said switch to said normally open switch when said switch is released by a driver.

2. The vehicle headlight dimming signalling system as described in claim 1 wherein said switch has an inoperative state wherein said signalling light is continuously off, a first operating state for flashing said signalling light "on and off" for a predetermined time and a second operating state for flashing said signalling light "on and off" continuously.

3. The headlight dimming signalling system described in claim 1 further comprising a means inside of said signalling vehicle for informing the driver of the signalling vehicle that said signalling system is operating.

4. The headlight dimming signalling system described in claim 1 wherein said signalling light is enclosed in a common housing with an "eye level" stop light.

5. The vehicle headlight dimming signalling system described in claim 4 wherein said control system comprises a photocell unit which is responsive to a bright headlight beam from a vehicle behind the signalling vehicle.

6. The headlight dimming signalling system described in claim 4 wherein a signalling light is enclosed in a housing which is common with a housing of an "eye level" stop light of said signalling vehicle and further comprising a pair of other signalling light, each of said other pair being enclosed in a housing which is common with a back-up light of said vehicle.

7. The headlight dimming signalling system described in claim 1 further comprising a second signalling light mounted on the rear of said vehicle.

8. The headlight dimming signalling system described in claim 7 wherein each of said signalling lights is mounted in a housing which is common with a housing of a back-up light of said signalling vehicle.

9. The headlight dimming signalling system described in claim 7 wherein each of said signalling lights is enclosed in a housing which is common with combination tail light/stop light of said signalling vehicle.

10. The vehicle headlight dimming signalling system described in claim 1 wherein said signalling system is operative only when an ignition switch of said signalling vehicle is closed.

11. The vehicle headlight dimming signalling system described in claim 10 wherein said system is operative only when said vehicle's headlights are operative.

12. In a motor vehicle of the type having a pair of headlights, a pair of combination stop and tail lights, an "eye level" stop light and a pair of back-up lights, a system for requesting a driver of a vehicle travelling behind another vehicle to dim his vehicle's bright headlights comprising: a pair of dedicated lights mounted at the rear of a vehicle, each of said lights being enclosed in a housing which is common with a back-up light of said signalling vehicle; a manual control, said control having a driver operated switch for initiating a first operating state for flashing said signalling lights "on and off" for a predetermined time and a second operating state for flashing said signalling light "on and off" continuously; and means for distinguishing said signalling light from said other lights of said signalling vehicle.

13. The headlight dimming signalling system described in claim 12 wherein said manual control is spring biased for returning said control system to an inoperative state when said driver operated switch is released.

14. In a motor vehicle of the type having a pair of headlights, a pair of combination stop and tail lights, an "eye level∝ stop light and a pair of back-up lights, a system for requesting a driver of a vehicle being a vehicle to dim his vehicle's bright headlights comprising: a pair of dedicated lights mounted at the rear of a vehicle in common housings with said vehicle's back-up lights, said lights having an operative state wherein said lights flash "on and off" to request the driver who is operating a vehicle behind the signalling vehicle to dim the headlights of the rear vehicle; an indicator light inside of said vehicle for informing the driver of the signalling vehicle that his vehicle's signalling system is operative; and means for distinguishing said signalling light from said other lights of said signalling vehicle.

15. In a motor vehicle which is adapted to selectively move in a forward direction and in a reverse direction and having a pair of lights mounted on the rear of the vehicle which are normally operative only when said vehicle is moving in said reverse direction, the improvement which comprises a means for flashing said lights "on and off" when said vehicle is moving in said forward direction to signal a driver who is operating a vehicle behind the signalling vehicle to dim his vehicle's bright lights.

16. The headlight dimming signalling system described in claim 15 wherein said means for flashing said lights "on and off" comprises: a driver operated control in the interior of said signalling vehicle, said control having an inoperative state wherein said signalling light is continuously off, a first operating state wherein said signalling light flash "on and off" for a predetermined time, and a second operating state wherein said signalling light flashes "on and off" for a continuous period of time, said control being spring biased to return said control from said first operative state to said inoperative state when said control is released by said driver; a time delay operatively connected to said driver control for causing said lights to flash "on and off" for a predetermined time when said control is returned to said inoperative state; a flasher unit operatively connected to said time delay to cause said lights to flash when said control is released by said driver.

17. A motor vehicle headlight dimming signalling system for requesting driver of a rear vehicle to dim his headlights comprising in combination: a housing mounted on the rear of said signalling vehicle, said housing having a first compartment, a first signalling bulb mounted in said first compartment for informing a driver of a vehicle behind the signalling vehicle that the brakes of the signalling vehicle have been applied, a second compartment, a second signalling bulb mounted in said second compartment for requesting said driver of said rear vehicle to dim his vehicle's headlights; a control for operating said headlight dimming signalling bulb, said control having a first operating state wherein said headlight dimming signalling bulb flashes "on and off" and a second state wherein said headlight dimming signalling bulb is inoperative; and means for distinguishing said signalling light rom said other lights of said signalling vehicle.

18. The headlight dimming signalling system recited in claim 17 further comprising a parabolic reflector mounted in said second compartment to focus the light rays from said headlight dimming signalling bulb.

19. The headlight dimming signalling system recited in claim 17 wherein said housing is mounted in the interior of said vehicle on a package tray.

20. The headlight dimming signalling system recited in claim 17 wherein said housing is mounted on the exterior of said vehicle on a body panel.

21. The headlight dimming signalling system recited in claim 17 wherein said means for distinguishing said signalling light from said other lights comprises a said signalling light in said first operating state which emits a flashing blue light.

22. The headlight dimming signalling system recited in claim 17 wherein said means for distinguishing said signalling light from said other light comprises a signalling light in said first operating state which emits a flashing green light.

23. The headlight dimming signalling system recited in claim 22 wherein said headlight dimming signalling light is mounted on said vehicle at an elevation which is substantially the eye level of the driver of said rear vehicle.

24. The headlight dimming signalling system recited in claim 17 wherein said control for operating said headlight dimming signalling bulb is responsive to a beam of light from said rear vehicle.

* * * * *

UNITED STATES PATENT AND TRADEMARK OFFICE
CERTIFICATE OF CORRECTION

PATENT NO.   : 5,119,067
DATED        : June 2, 1992
INVENTOR(S)  : Robert Adell It is certified that error appears in the above-identified patent and that said Letters Patent is hereby corrected as shown below:

Column 2, line 38, after "which", insert --shows an--

Column 2, line 39, after "mounted", insert --in a--

Column 3, line 28, change "cove" to --cover--

Column 3, line 44, change "t" to --to--

Column 3, line 54, change "S4" to --34--

Column 4, lines 10,11, change ". There" to --, there--

Column 6, line 29, change "light" to --lights--

Column 7, line 5, change "eye level oc" to --"eye level"--

Column 7, line 6, change "being" to --behind--

Column 8, line 34, change "light" to --lights--

Column 8, line 15, change "rom" to --from--

Signed and Sealed this

Seventeenth Day of August, 1993

Attest:

BRUCE LEHMAN

*Attesting Officer*     *Commissioner of Patents and Trademarks*